United States Patent
Wilson (10) Patent No.: US 9,296,895 B2
(45) Date of Patent: Mar. 29, 2016

(54) SELF-HEALING POLYMERIC MATERIALS VIA UNSATURATED POLYESTER RESIN CHEMISTRY

(71) Applicant: Autonomic Materials, Inc., Champaign, IL (US)

(72) Inventor: Gerald O. Wilson, Champaign, IL (US)

(73) Assignee: Autonomic Materials, Inc., Champaign, IL (US)

(*) Notice: Subject to any disclaimer, the term of this patent is extended or adjusted under 35 U.S.C. 154(b) by 0 days.

(21) Appl. No.: 14/303,494

(22) Filed: Jun. 12, 2014

(65) Prior Publication Data

US 2014/0371362 A1    Dec. 18, 2014

Related U.S. Application Data

(60) Provisional application No. 61/834,733, filed on Jun. 13, 2013.

(51) Int. Cl.
| | |
|---|---|
| C08K 9/10 | (2006.01) |
| B29C 73/16 | (2006.01) |
| C08L 75/04 | (2006.01) |
| C09J 133/06 | (2006.01) |
| C09J 133/08 | (2006.01) |
| C09J 175/00 | (2006.01) |
| C09D 175/04 | (2006.01) |
| B29C 73/22 | (2006.01) |
| C09D 167/08 | (2006.01) |
| C09J 167/08 | (2006.01) |
| C08L 67/08 | (2006.01) |
| C08L 61/28 | (2006.01) |
| C08L 61/24 | (2006.01) |

(52) U.S. Cl.
CPC ............ *C08L 75/04* (2013.01); *B29C 73/16* (2013.01); *B29C 73/22* (2013.01); *C08K 9/10* (2013.01); *C08L 67/08* (2013.01); *C09D 167/08* (2013.01); *C09D 175/04* (2013.01); *C09J 133/066* (2013.01); *C09J 133/08* (2013.01); *C09J 167/08* (2013.01); *C09J 175/00* (2013.01); *C08L 61/24* (2013.01); *C08L 61/28* (2013.01)

(58) Field of Classification Search
CPC ........... B29C 73/16; B29C 73/22; C08K 9/10
See application file for complete search history.

(56) References Cited

U.S. PATENT DOCUMENTS

| | | | |
|---|---|---|---|
| 4,419,139 A | 12/1983 | Gooch et al. | |
| 4,555,564 A | 11/1985 | Fischer et al. | |
| 5,053,483 A * | 10/1991 | Knox | ......................... 528/295.5 |
| 5,561,173 A | 10/1996 | Dry | |
| 6,075,072 A | 6/2000 | Guilbert et al. | |
| 2008/0300340 A1 | 12/2008 | Gross et al. | |
| 2009/0208684 A1 * | 8/2009 | Dunleavy et al. | ............ 428/36.4 |
| 2009/0226828 A1 | 9/2009 | De Jong et al. | |
| 2010/0331445 A1 | 12/2010 | Wilson et al. | |
| 2011/0039980 A1 | 2/2011 | Caruso et al. | |
| 2011/0236667 A1 | 9/2011 | Blum et al. | |

FOREIGN PATENT DOCUMENTS

| | | |
|---|---|---|
| EP | 0803297 B1 | 7/2002 |
| JP | 57-122966 A | 7/1982 |

* cited by examiner

*Primary Examiner* — Vickey Nerangis
(74) *Attorney, Agent, or Firm* — Schwabe Williamson & Wyatt (57) ABSTRACT

Disclosed herein are self-healing materials, which are smart materials that are capable of repairing themselves without any external intervention when they are damaged. The self-healing materials may be microencapsulated, for example in a one-capsule system or a two-capsule system, and damage to a matrix containing the microcapsules may rupture the microcapsules and cause the healing materials to be released into the site of damage, where it may polymerize and restore the functional capabilities of the matrix. The self-healing materials may be based on unsaturated multi-functional resins capable of oxygen-initiated cross-linking, and may include alkyd resins, such as alkyd resins that include one or more telechelic end groups.

27 Claims, 9 Drawing Sheets

SELF-HEALING POLYMERIC MATERIALS VIA UNSATURATED POLYESTER RESIN CHEMISTRY

TECHNICAL FIELD

Embodiments herein relate to self-healing materials, particularly self-healing materials based on unsaturated multifunctional resins capable of oxygen-initiated cross-linking.

BACKGROUND

The failure of polymeric materials can have significant consequences. In the case of coatings, the failure of a coating due to a significant traumatic event or mechanical damage due to a more gradual decline as a result of the coating's environment may lead to exposure of the underlying substrate to the environment. Once exposed, a substrate may degrade through corrosion, in the case of metal substrates, or through other decomposition reactions, in the case of non-metal substrates. The failure of coatings, polymerized resins, adhesives, sealants, and composites may necessitate costly repairs and the sidelining of parts, equipment, or facilities comprised of these materials. In addition to the costly maintenance associated with the failure of materials, increasingly expensive starting materials from petroleum stocks, as well as the need for the minimization of environmental impact, all benefit from the use of longer-lasting materials. Materials that can repair themselves when they are damaged will last longer in their specific applications.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIGS. 5A-5C illustrate self-healing performance observed in a polyurea coating, wherein FIG. 5A shows the results of a test with a control sample, which was an un-pigmented polyurea coating, FIG. 5B illustrates the results of a test with a self-healing sample, which contained 20 wt % of microcapsules containing ethyl phenyl acetate and an alkyd resin with epoxy end groups (the microcapsule additives are referred to herein as Series 3 (S3)), and FIG. 5C is a graph illustrating the degree of corrosion creep observed with two different sizes of scribes, in accordance with various embodiments;

FIGS. 6A-6E illustrate self-healing performance in a polyethylene powder coating, where self-healing of scribes with 3 different widths (46 microns, 186 microns, and 500 microns) was evaluated, and wherein FIG. 6A illustrates the results of a test with a control sample, FIG. 6B illustrates the results of a test with a sample containing 20 wt % of microcapsules containing ethyl phenyl acetate and an alkyd resin with epoxy end groups, FIG. 6C is a graph illustrating the degree of corrosion creep observed with a 46 micron scribe, FIG. 6D is a graph illustrating the degree of corrosion creep observed with a 186 micron scribe, and FIG. 6E is a graph illustrating the degree of corrosion creep observed with a 500 micron scribe, in accordance with various embodiments;

FIGS. 8A-8C illustrate the self-healing performance of two versions of an epoxy coating applied to CRS panels, wherein FIG. 8A illustrates a control sample, which was coated with a commercially available epoxy primer, FIG. 8B illustrates a self-healing sample, which was coated with the same commercially available epoxy primer, to which 5 wt % of microcapsules containing ethyl phenyl acetate and an alkyd resin with epoxy end groups had been added, and FIG. 8C is a graph illustrating the degree of corrosion creep observed with two different sizes of scribes, in accordance with various embodiments;

DETAILED DESCRIPTION OF EMBODIMENTS OF THE INVENTION

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Disclosed herein in various embodiments are self-healing materials, which are smart materials that are capable of repairing themselves without any external intervention when they are damaged. In various embodiments, some or all of the self-healing materials may be microencapsulated, and damage to a matrix containing the microcapsules may rupture the microcapsules and cause the healing materials to be released into the site of damage, where they may polymerize and restore the functional capabilities of the matrix. As used herein, the term "matrix" refers to any material that includes a plurality of microcapsules.

Figure 1:
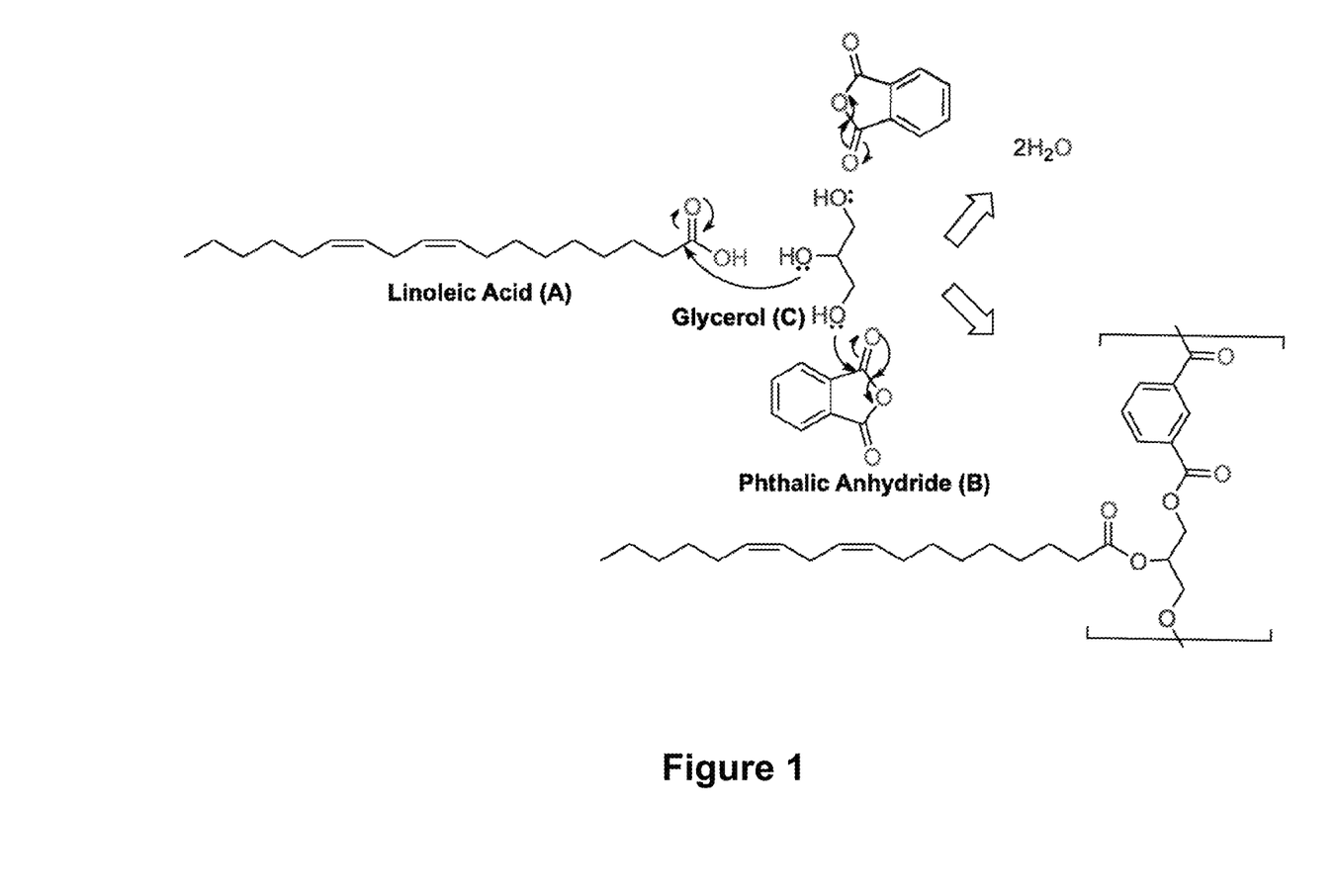
FIG. 1 illustrates the chemical synthesis of an alkyd resin from linoleic acid and phthalic anhydride, in accordance with various embodiments.

FIG. 1 illustrates the chemical synthesis of an alkyd resin from linoleic acid and phthalic anhydride. In various embodiments, alkyd resins such as the illustrated resin may be used as a self-healing agent in a self-healing polymer system. More specifically, various self-healing systems may take advantage of the ability of unsaturated functional groups, such as those present in fatty acids (labeled "A" in FIG. 1), to cross-link in the presence of oxygen. For example, a tri-functional alcohol (labeled "C" in FIG. 1), such as glycerol, may undergo an esterification reaction with an acid that, in turn, contains a functionality, such as anhydride functionality (labeled "B" in FIG. 1), that is capable of polymerization to form a resin. In various embodiments, this may create a bi-functional resin that can be encapsulated in a healing agent formulation for delivery to a damage site during a healing event. Once released at the site of damage, the unsaturated functional groups ("A") may cross-link in the presence of oxygen to yield a polymer that heals the damage. Some embodiments of the disclosed self-healing materials may be configured as a one-capsule system, whereas other embodiments may take the form of a two-capsule system.

Figure 2A:
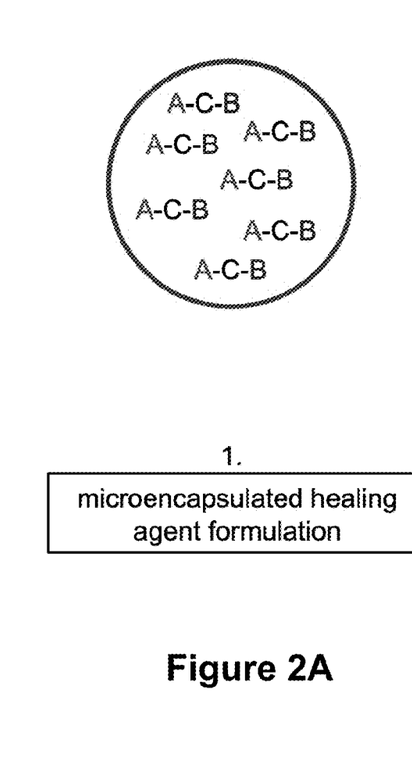
FIGS. 2A-2C depict a schematic diagram illustrating self-healing via cross-linking of unsaturated functional groups of an alkyd resin, including the microencapsulated healing agent formulation (FIG. 2A), the release of the resin at the damage site (FIG. 2B), and the cross-linking of the resin at the damage site (FIG. 2C), in accordance with various embodiments.
Figure 2B:
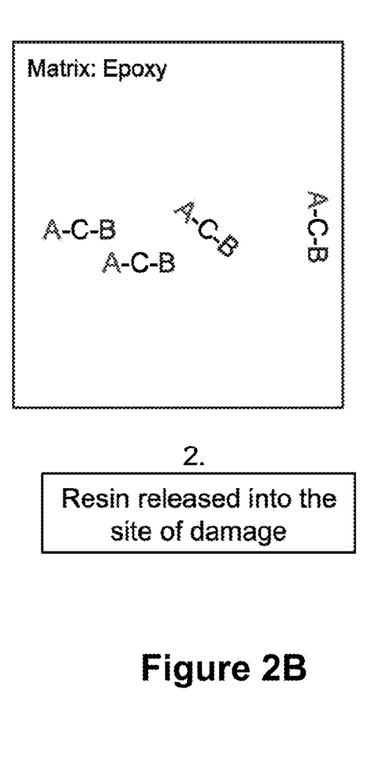
Figure 2C:
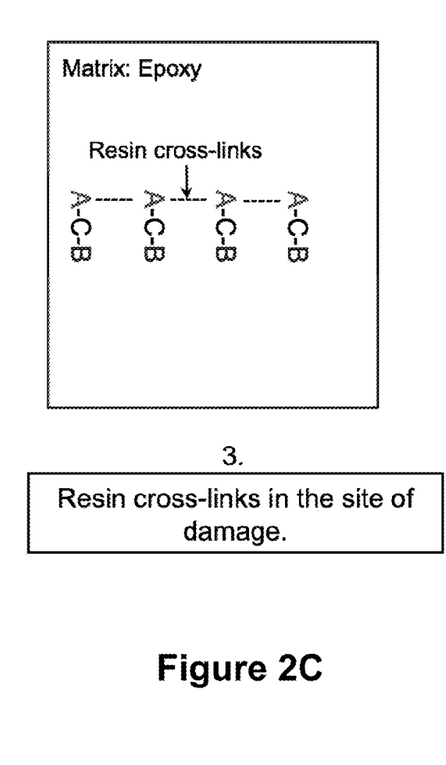

In embodiments that take the form of a one-capsule system, a healing material comprising a resin, such as an alkyd resin, may be formulated as illustrated in FIG. 1, wherein both a non-polar solvent and a polar solvent may be encapsulated together in a microcapsule. In these embodiments, the polar solvent may have a range of properties that renders it suitable for encapsulation and stabilization of the resin to prevent premature cross-linking of the resin. When the microcapsule is ruptured during a healing event, it may then release the healing agent into the site of damage where the solvents (both polar and non-polar) evaporate, allowing cross-linking to be initiated by the uptake of oxygen from the environment. This process is illustrated schematically in FIGS. 2A-2C, which depict self-healing via cross-linking of unsaturated functional groups of an alkyd resin, including the microencapsulated healing agent formulation (FIG. 2A), the release of the resin at the damage site (FIG. 2B), and the cross-linking of the resin at the damage site (FIG. 2C).

While the non-polar solvents may be common solvents such as xylene ethyl benzene or low polarity acetates, the polar solvents generally possess a set of properties that enable microencapsulation and stabilization of the resin. For example, in some embodiments, the polar solvent may maintain a polar environment within the capsules, thus preventing premature cross-linking of the resin (e.g., due to antioxidation). The solvent also may have a dielectric constant of ≥5.0, and may have a high enough boiling point to maintain high thermal stability for the system as a whole, for example ≥225° C. in various embodiments. Additionally, the polar solvent may have a low enough vapor pressure to prevent premature evaporation, which could compromise the polar environment and potentially lead to premature cross-linking of the resin in the healing agent formulation. In some embodiments, a vapor pressure of <0.5 mm Hg at 20° C. also is desirable. In various embodiments, the polar solvent also is insoluble in water for facile incorporation into a hydrophobic healing agent formulation and encapsulation, and generally the polar solvent also has low toxicity, with LD 50 (oral, rat) values ≥3000 mg/kg. Specific, non-limiting examples of solvents that meet these criteria include, but are not limited to ethyl phenyl acetate (CAS #: 101-97-3), phenyl ethyl acetate (CAS #: 103-45-7), and phenyl ethyl phenyl acetate (CAS #: 102-20-5).

In various embodiments, the characteristics of the polar aprotic solvent may be selected in order to achieve the desired kinetics for the self-healing process. As described above, in some embodiments, the characteristics of the polar aprotic solvent may be optimized to prevent premature cross-linking of the healing agent that would render it unavailable during a healing event. However, in other embodiments, the formulation may be customized in order to increase or decrease the healing agent reaction rate as desired. For example, because the reaction of the healing agent depends on the cross-linking of the unsaturated groups, which will not readily occur in the presence of the polar aprotic solvent, in some embodiments, the concentration of the polar aprotic solvent in the healing agent formulation may be adjusted to tune the healing kinetics of a self-healing system.

Table 1 below shows an example of the effect of decreasing the concentration of a polar aprotic solvent (ethyl phenyl acetate in this case) on the gelation and cure times of the healing agent formulation. The data demonstrate that decreasing the concentration of the ethyl phenyl acetate and replacing it with a solvent with lower polarity, such as hexyl acetate, results in quicker gelation and cure times. In addition to confirming the efficacy of a polar aprotic solvent in retarding premature polymerization of the healing agent, these data demonstrate that upon release from the microcapsules, the replacement of an increasing amount of the polar aprotic solvent with solvents with lower polarities and higher vapor pressures may lead to self-healing systems with faster healing kinetics. In various embodiments, the optimum rate of healing required may differ from one application to the next. However, that optimum rate may be achieved in various embodiments by varying the concentration of the polar aprotic solvent in the formulation.

TABLE 1

Gelation and cure times as a function of polar aprotic solvent concentration in a healing agent formulation

| Polar Aprotic Solvent Component (wt %) | Time to gelation of healing agent (h) | Time to full cure (h) |
|---|---|---|
| 20 | 2 | 96 |
| 10 | 1 | 60 |
| 5 | 0.5 | 36 |
| 2.5 | 0.3 | 24 |

The solvent used in this example was ethyl phenyl acetate, and in formulations in which its concentration was decreased, hexyl acetate was used in its place. To simulate the evaporation of the solvent during a healing event, 5 drops of the healing agent formulation being evaluated was applied to the center of a 3-inch by 5-inch cold-rolled steel panel and evaluated periodically.

Figure 3:
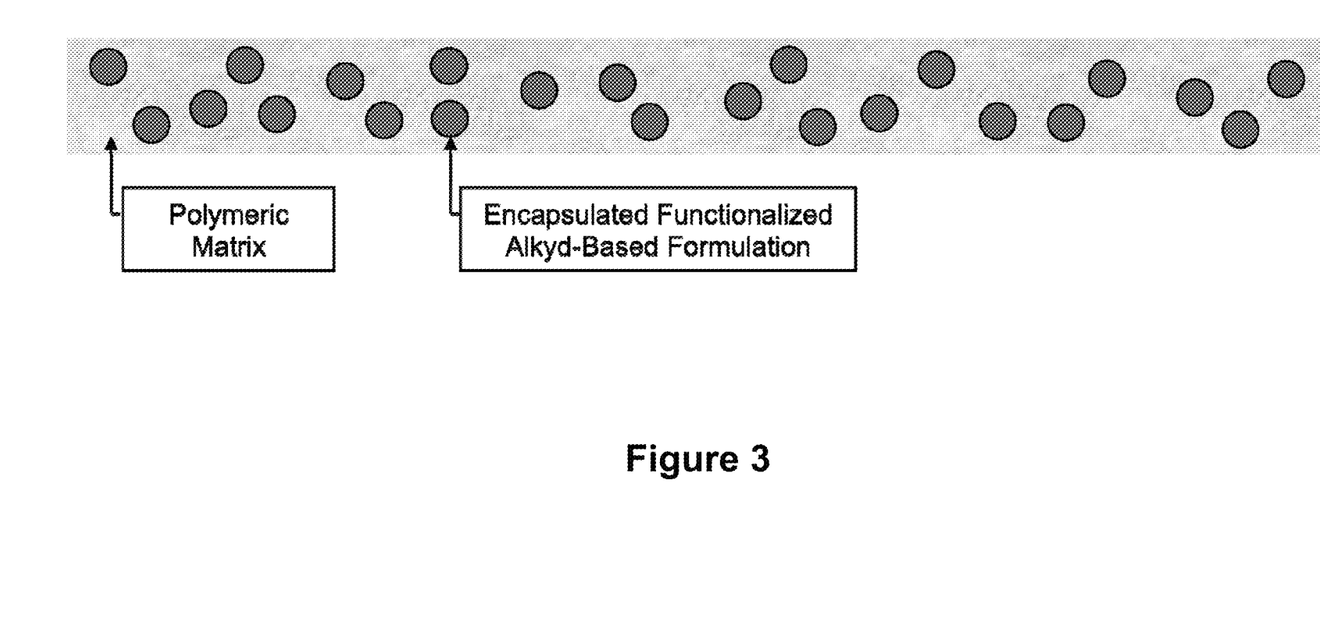
FIG. 3 is a schematic diagram illustrating a one-capsule system, in accordance with various embodiments.

FIG. 3 is a schematic diagram illustrating a one-capsule system, in accordance with various embodiments. Whether the application is a coating, sealant, adhesive, thermosetting composite, thermoplastic composite, or some other polymeric matrix material, microcapsules may be embedded in the material prior to use in the specific application.

Figure 4:
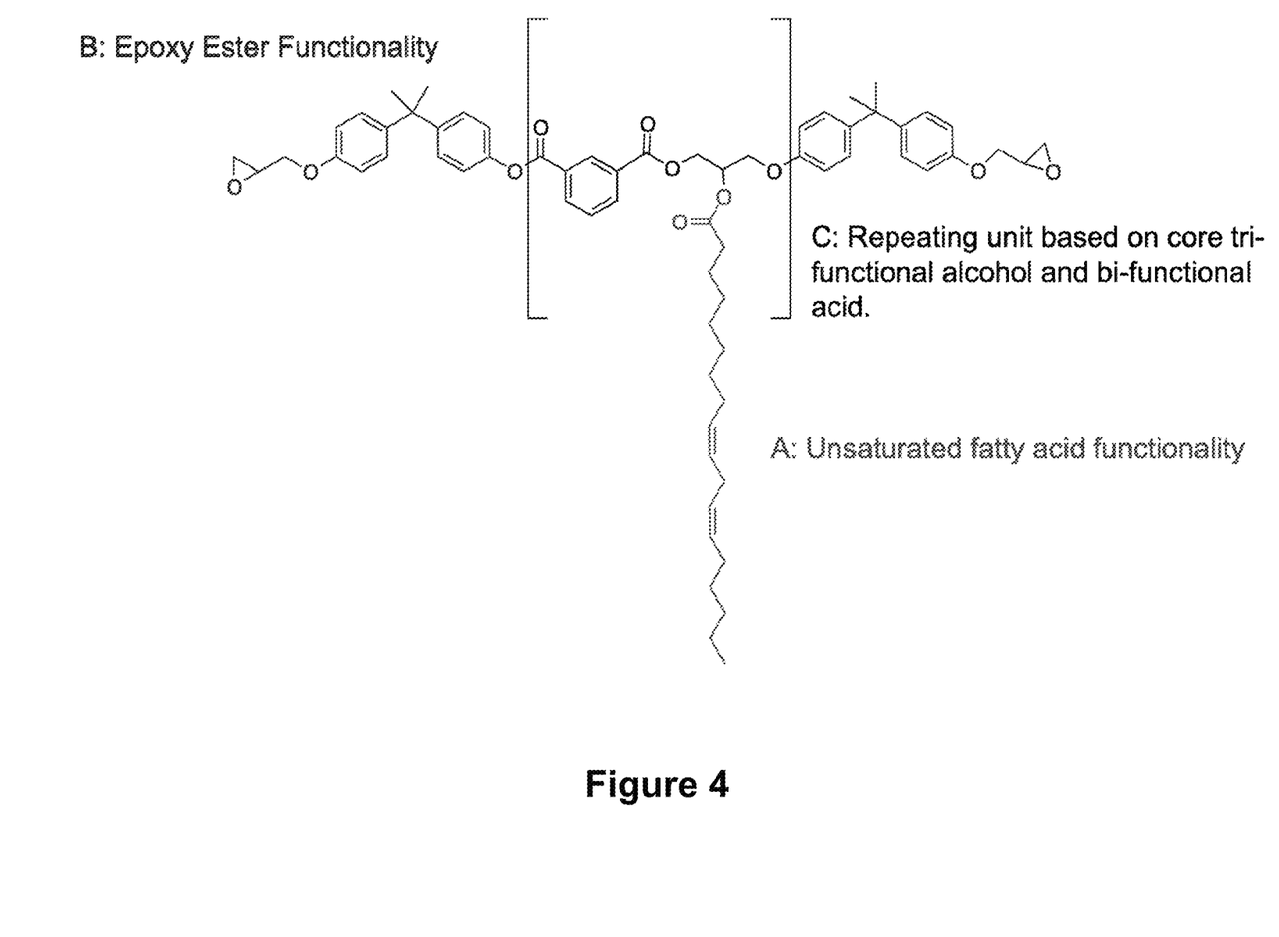
FIG. 4 illustrates the chemical structure of an example of a representative resin used in several coating performance tests, in accordance with various embodiments.

An example of the use of a one-capsule system in liquid coatings is the use of microcapsules containing an epoxy-functionalized alkyd where oligomers contain telechelic epoxy functional groups, such as that shown in FIG. 4, which illustrates the chemical structure of an example of a representative resin used in coating performance tests, in accordance with various embodiments. In accordance with various embodiments, the cross-linking of the unsaturated groups in the fatty acid chain (see, e.g., A-groups, FIG. 1) leads to the formation of a cured polymer that restores the barrier property of the coating.

Figure 5A:
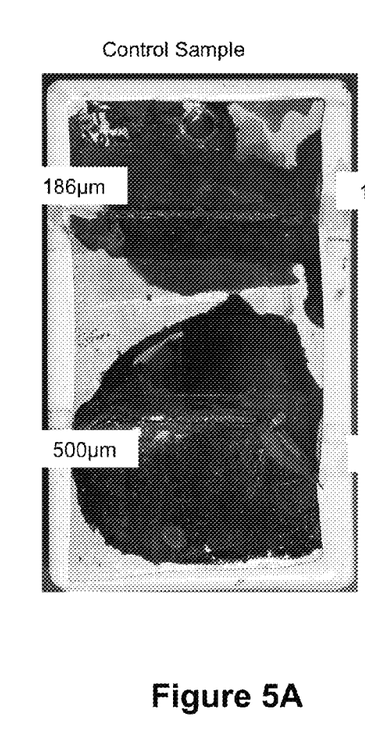
Figure 5B:
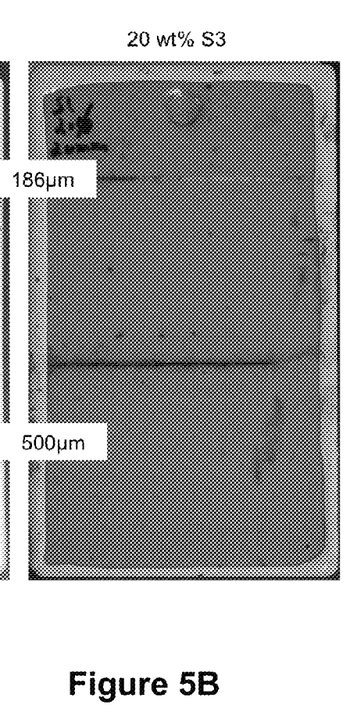
Figure 5C:
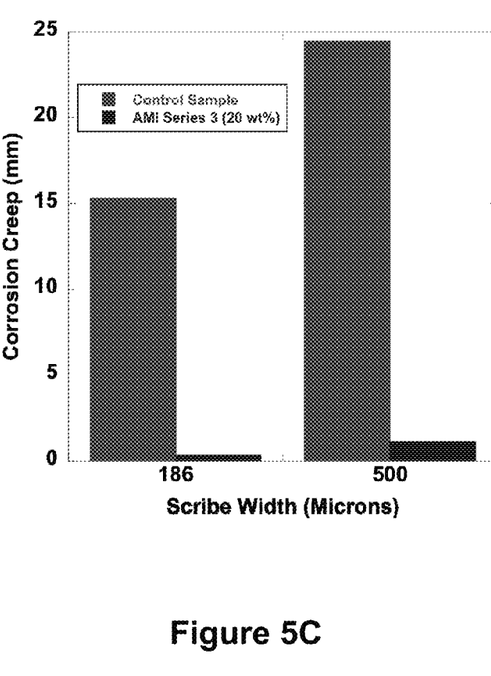

FIGS. 5A-5C illustrate self-healing performance observed in a polyurea coating. FIG. 5A illustrates the results of a test with a control sample, which was an un-pigmented polyurea coating, FIG. 5B illustrates the results of a test with a self-healing sample, which contained 20 wt % of microcapsules containing ethyl phenyl acetate and an alkyd resin with epoxy end groups (the microcapsule additives are referred to as Series 3 (S3)), and FIG. 5C is a graph illustrating the degree of corrosion creep observed with two different sizes of scribes, in accordance with various embodiments. For the example illustrated in FIG. 5, as well as the remaining examples described below, the microcapsules were mixed into the coating formulation prior to application on the substrate. The coating samples were prepared by drawing down the coating onto the desired substrate using a draw down bar, although similar results have been observed using conventional and airless spray equipment. After application of the coating, the sample was allowed to cure for 24 hours, after which it was intentionally damaged using 186 and 500-micron scribe tools, respectively.

The samples were then allowed to heal at room temperature for 24 hours and then put into a salt fog, in which they were exposed to conditions specified by ASTM B117 for 1000 hours (ASTM Standard B117-11, 2003, "Standard Practice for Operating Salt Spray (Fog) Apparatus," ASTM International, West Conshohocken, Pa., www.astm.org). After exposure to the salt fog, the amount of corrosion creep from the scribe was measured in mm.

FIGS. 5A and 5B show two versions of an un-pigmented polyurea coating applied to cold-rolled steel (CRS) substrates. The control sample (FIG. 5A) was coated with the standard un-pigmented coating, while the self-healing sample (FIG. 5B) contained 20 wt % of microcapsules containing a formulation comprised of an alkyd resin such as that shown in FIG. 4, and a polar solvent meeting the criteria described above such as ethyl phenyl acetate. As shown in FIG. 5C, after exposure to ASTM B117, the control sample exhibited significant visible corrosion creep from scribe, while the self-healing exhibited minimal (in the case of the 500 micron scribe damage) to hardly any corrosion creep from scribe (in the case of the 186 micron scribe damage). Similar results also were observed for a range of coating and matrix chemistries including epoxies, polyurethanes, alkyds, epoxy vinyl esters, silicones, and other liquid coating chemistries.

Figure 6A:
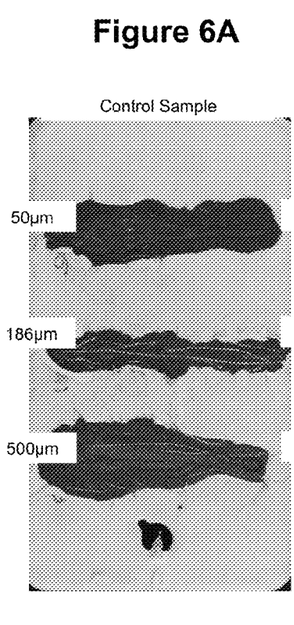
Figure 6B:
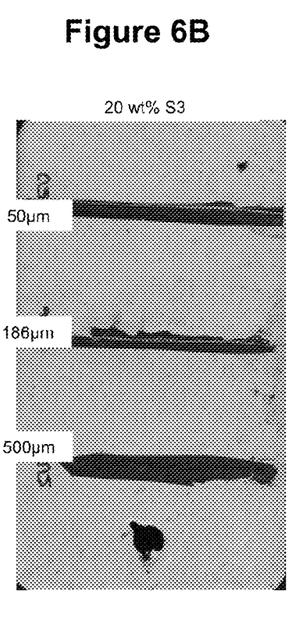
Figure 6C:
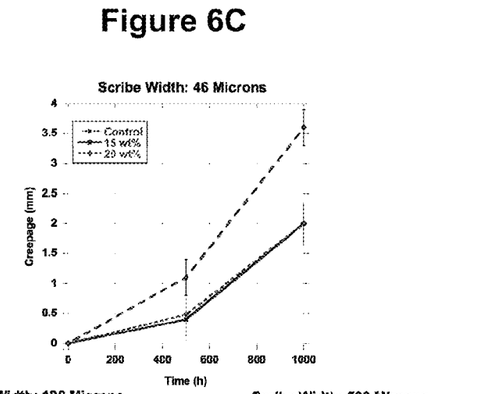
Figure 6D:
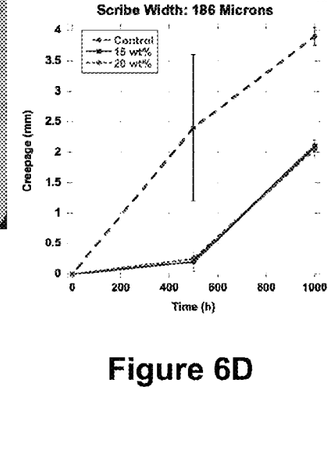
Figure 6E:
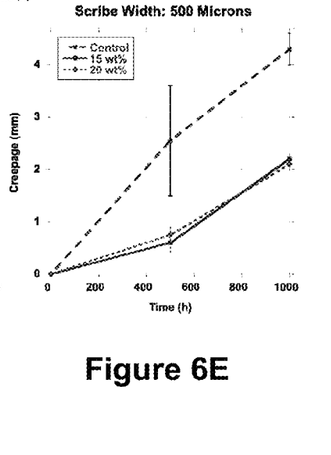

FIGS. 6A-6E illustrate self-healing performance in a polyethylene powder coating, wherein self-healing of scribes with 3 different widths (46 microns, 186 microns and 500 microns) was evaluated; wherein FIG. 6A illustrates the results of a test with the control sample, FIG. 6B illustrates the results of a test with a sample containing 20 wt % of microcapsules containing ethyl phenyl acetate and an alkyd resin with epoxy end groups, FIG. 6C is a graph illustrating the degree of corrosion creep observed with a 46 micron scribe, FIG. 6D is a graph illustrating the degree of corrosion creep observed with a 186 micron scribe, and FIG. 6E is a graph illustrating the degree of corrosion creep observed with a 500 micron scribe, in accordance with various embodiments. Unlike liquid coatings that can be patched if damage to an area is observed, powder coatings, which are cured when polymeric particles heated above their melting point, melt and flow to form a uniform coating, are not easily repaired in service with the same kind of coating. This is due to the fact that powder-coated parts are often cured in large ovens that are not feasible to use in service. When these coatings are used for protection of the underlying asset from corrosion, the inability to properly repair them in service when they are damaged is of significant concern.

In the embodiment illustrated in FIGS. 6A-6E, spray-dried microcapsules were mixed into dry powder coating formulations to form dry blends that were then applied to CRS substrates via an electrostatic spray-gun or a fluidized bed. While the control sample exhibited significant corrosion creep from scribe after exposure to ASTM B117 conditions for 1000 hours (see, e.g., FIG. 6A), the self-healing samples exhibited minimal corrosion creep from scribe (see, e.g., FIG. 6B). As shown in FIGS. 6C-6E, the control sample exhibited significant visible corrosion creep from scribe, while the self-healing exhibited minimal (in the case of the 500 micron scribe damage, FIG. 6E) to hardly any corrosion creep from scribe (in the case of the 186 micron scribe and 46 micron scribe damage, FIGS. 6C and 6D). Similar results were also demonstrated for other powder coatings, including epoxies and polyesters.

In various embodiments, matrix adhesion may be improved via functional group matching. Specifically, self-healing performance may be improved and thereby the concentration of the microencapsulated self-healing additive may be lowered by taking advantage of telechelic groups in the resin. In some embodiments, functional group matching may be used with an alkyd resin with telechelic epoxy functional groups as illustrated in FIG. 4. For instance, when a self-healing material is formulated as described above, and a resin such as that shown in FIG. 4 is released into the site of damage during a healing event, the epoxy group will cross-link with residual epoxy groups and epoxy curing agents present in the matrix. The result is a polymerized healing agent that is covalently bonded to the matrix in addition to other non-covalent interactions that are likely to be present (see, e.g., FIG. 6). This improved adhesion to the matrix may lead to improved self-healing performance at lower concentrations of the healing agent. Although the embodiment illustrated in FIG. 4 uses an alkyd resin with telechelic epoxy functional groups, other embodiments may use an alkyd resin that includes telechelic end groups that may cross-link with other complementary residual reactive groups such as isocyanates, polyols, vinyl-terminated silanes, vinyl and other unsaturated groups.

Figure 7A:
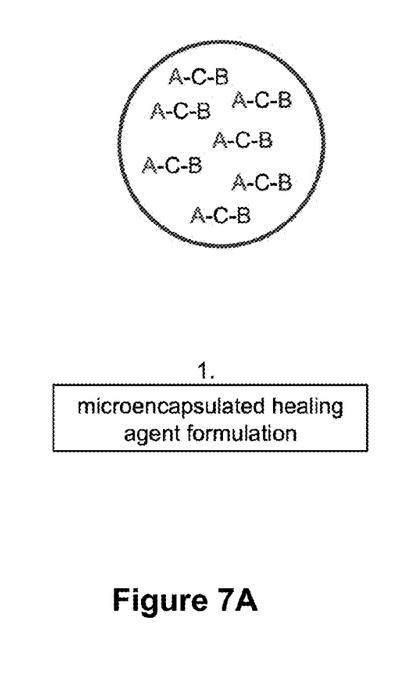
FIGS. 7A-7C depict a schematic diagram illustrating self-healing via cross-linking of unsaturated functional groups of an alkyd resin, including the microencapsulated healing agent formulation (FIG. 7A), the release of the resin at the damage site (FIG. 7B), and the cross-linking of the resin at the damage site, as well as the formation of covalent linkages, non-covalent linkages, or both covalent and non-covalent linkages with the matrix (FIG. 7C), in accordance with various embodiments.
Figure 7B:
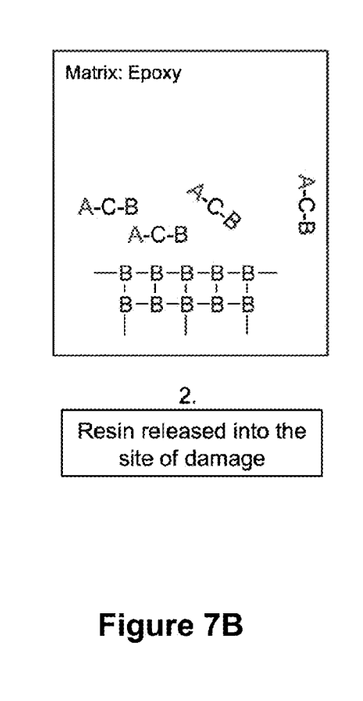
Figure 7C:
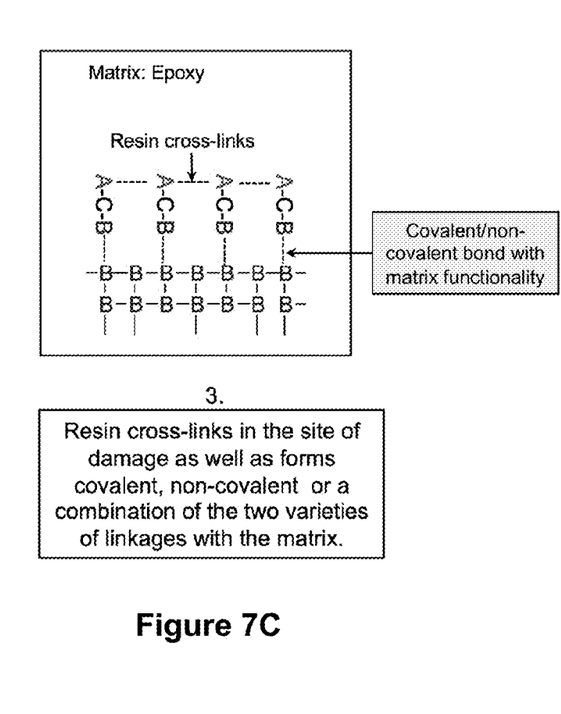
Figure 8A:
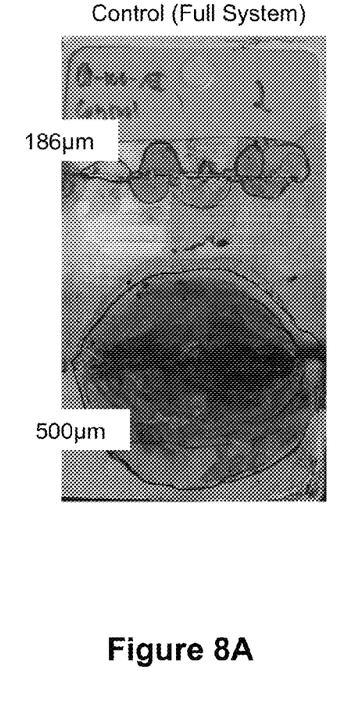
Figure 8B:
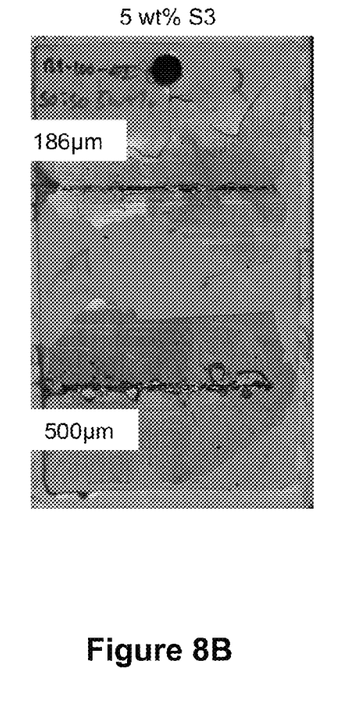
Figure 8C:
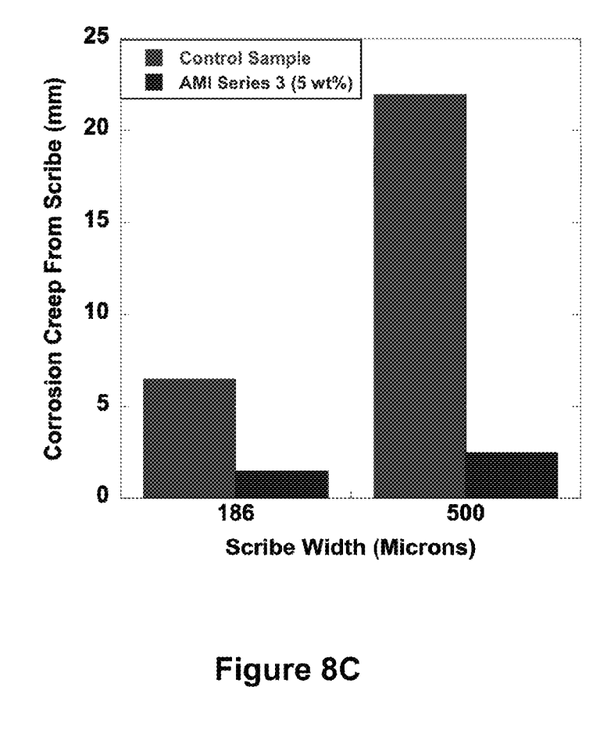

An example of the result of improved adhesion to the matrix is shown in a comparison between a fully-formulated epoxy coating (control) and a similar epoxy coating containing 5 wt % of microcapsules containing a formulation comprised of an alkyd resin, such as that shown in FIG. 4, and a polar solvent meeting the criteria described above, such as ethyl phenyl acetate. FIGS. 7A-7C depict a schematic diagram illustrating improved adhesion to the matrix with a self-healing via cross-linking of unsaturated functional groups of an alkyd resin, including the microencapsulated healing agent formulation (FIG. 7A), the release of the resin at the damage site (FIG. 7B), and the cross-linking of the resin at the damage site, as well as the formation of covalent linkages, non-covalent linkages, or both covalent and non-covalent linkages with the matrix (FIG. 7C), in accordance with various embodiments;

FIGS. 8A-8C illustrate the self-healing performance of two versions of an epoxy coating applied to CRS panels, wherein FIG. 8A illustrates a control sample, which was coated with a commercially available epoxy primer, FIG. 8B illustrates a self-healing sample, which was coated with the same commercially available epoxy primer, to which 5 wt % of microcapsules containing ethyl phenyl acetate and an alkyd resin with epoxy end groups had been added, and FIG. 8C is a graph illustrating the degree of corrosion creep observed with two different sizes of scribes, in accordance with various embodiments. As exhibited in FIG. 8C, while corrosion creep from the initial 186 and 500-micron scribes is significant for the control samples after exposure to conditions specified by ASTM B117, corrosion from similar scribes is in the self-healing sample is limited.

Similar self-healing systems may be used in which the telechelic groups of the multifunctional resin (e.g., B-groups in FIG. 4) are functional groups, such as isocyantes or polyols for cross-linking with polyurethane matrices, silanol or vinyl terminated silanes for cross-linking with silicone-based matrices, vinyl groups for cross-linking with vinyl esters etc. Various unsaturated fatty acids (e.g., palmitoleic acid, oleic acid, docosahexaenoic acid) and other unsaturated functional groups (e.g., A-groups in FIG. 4) may be used in the design of self-healing systems based on this concept. The core trifunctional alcohol on which the multi-functional resin or monomer is based can be any tri-functional alcohol such as glycerol, a trifunctional silanol or any other tri-functional alcohol that may include other functional groups such as fluorinated functional groups or other reactive functional groups such as epoxy, vinyl or isocyanate groups as additional points for cross-linking.

Figure 9:
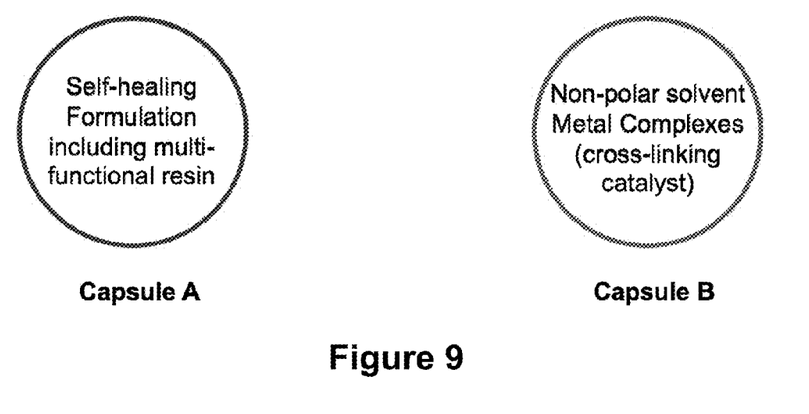
FIG. 9 is a schematic diagram illustrating an example of a standard dual-capsule system, in accordance with various embodiments.

Other embodiments involve a two-capsule system. In various embodiments, the healing kinetics of a self-healing system may be improved by improving the reaction kinetics of the base resin component of the self-healing system. In the case of the multi-functional resins that form the basis of this self-healing system, the reaction kinetics can be improved by improving the rate of cross-linking of the unsaturated functional groups (labeled "A," in FIG. 4). In various embodiments, this approach may be considered the basis of a standard dual-capsule system. FIG. 9 is a schematic diagram illustrating an example of a standard dual-capsule system, in accordance with various embodiments. In various embodiments, two varieties of microcapsules may be embedded into the matrix. The first variety of microcapsules may contain a healing agent formulated as described above for a one-capsule system (Capsule A, FIG. 9).

The second variety of microcapsules may contain a catalyst, typically a metallic salt or complex, which is commonly referred to as a drier when the resin or monomer is an alkyd (Capsule B, FIG. 9). Examples of metal complexes that can be used either by themselves or in combination with others include primary driers based on cobalt, manganese, iron, cerium, and vanadium. These driers can be used in concert with secondary driers based on zirconium, bismuth, barium, and aluminum complexes and or auxiliary driers based on calcium, zinc, lithium and potassium complexes, to name a few examples. For facile mixing of healing agents released into the site of damage, in various embodiments, the nonpolar solvent in the capsule containing the resin (Capsule A) may be used as the medium for delivery of the catalyst (Capsule B).

Figure 10:
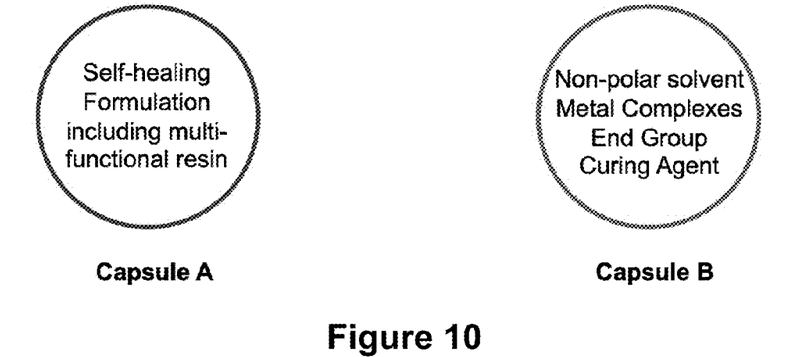
FIG. 10 illustrates a schematic diagram illustrating an example of a hybrid dual-capsule system, in accordance with various embodiments.

An alternative approach to designing a dual capsule system is based on a Capsule B formulation that includes a curing agent for the telechelic group (labeled "B" in FIG. 4) in addition to a catalyst for the cross-linking of the unsaturated groups (labeled "A" in FIG. 4). FIG. 10 illustrates a schematic diagram illustrating an example of such a hybrid dual-capsule system, in accordance with various embodiments. Just as the use of Capsule B in the standard dual-capsule system improves the rate and degree of cross-linking of the unsaturated groups (A-groups), the inclusion of a curing agent for the telechelic group improves efficiency of conversion of these groups and thus cross-linking with the matrix.

The concept of self-healing described herein depends on the ability to microencapsulate healing agent formulations in microcapsules comprised of polymeric shell walls. In various embodiments, various shell walls can be used for the compartmentalization of healing agents including urea-formaldehyde, polyurethane, and combinations of the two. Resulting microcapsules may be incorporated into a formulation in a wet final form (such as a slurry or wet cake), which might contain moisture at 15 wt % and greater or in a dry final form, which typically contains moisture at 2 wt % or less. All microcapsules may be produced at a range of 1 micron or greater, but in various embodiments, size scales for the applications discussed above may be between 5 and 100 microns. In various embodiments, self-healing materials based on the present system may be comprised of microcapsules at concentrations as low as 1 wt % and as high as 20 wt %.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A self-healing polymeric material comprising:
   a first microcapsule; and
   an unsaturated multifunctional resin capable of oxygen-initiated cross-linking, and
   a polar solvent that is insoluble in water and has a boiling point $\geq 225°$ C., wherein the unsaturated multifunctional resin and the polar solvent are disposed within the first microcapsule.

2. The self-healing polymeric material of claim 1, wherein the unsaturated multifunctional resin comprises an alkyd resin.

3. The self-healing material of claim 2, wherein the alkyd resin is formed from a fatty acid, a tri-functional alcohol and an acid or acid anhydride.

4. The self-healing polymeric material of claim 3, wherein the tri-functional alcohol comprises glycerol, a trifunctional silanol, or a tri-functional alcohol that comprises a fluorinated, epoxy, vinyl, or isocyanate functional group.

5. The self-healing polymeric material of claim 2, wherein the alkyd resin comprises a telechelic end group.

6. The self-healing polymeric material of claim 5, wherein the telechelic end group comprises an epoxy, an isocyanate, a polyol, a silanol, a vinyl terminated silane, a vinyl group, an unsaturated fatty acid, or an unsaturated functional group.

7. The self-healing polymeric material of claim 6, further comprising a non-polar solvent disposed within the first microcapsule.

8. The self-healing polymeric material of claim 7, wherein the non-polar solvent comprises xylene, ethyl benzene, or a low-polarity acetate.

9. The self-healing polymeric material of claim 7, wherein the polar solvent:
   a. maintains a polar environment within the microcapsule;
   b. has a dielectric constant of ≥5.0;
   c. has a vapor pressure of <0.5 mm Hg at 20° C.;
   d. has a LD 50 (oral, rat) value ≥3000 mg/kg; or
   e. a combination of any of a-e.

10. The self-healing polymeric material of claim 7, wherein the polar solvent comprises ethyl phenyl acetate, phenyl ethyl acetate, or phenyl ethyl phenyl acetate.

11. The self-healing polymeric material of claim 1, further comprising a second microcapsule, wherein the second microcapsule comprises a catalyst or a curing agent.

12. The self-healing polymeric material of claim 11, wherein the catalyst comprises cobalt, manganese, iron, cerium, vanadium, zirconium, bismuth, barium, aluminum, calcium, zinc, lithium, or potassium complexes.

13. The self-healing polymeric material of claim 1, wherein the microcapsule comprises urea-formaldehyde, polyurethane, melamine-formaldehyde, polyacrylate or a combination thereof.

14. The self-healing polymeric material of claim 1, wherein the microcapsule has an average diameter of between about 0.5 microns and about 100 microns.

15. A composition comprising the self-healing polymeric material of claim 1, wherein the composition is a coating, a resin, an adhesive, a thermosetting composite, a thermoplastic composite, or a sealant.

16. The composition of claim 15, wherein the composition is a coating, and wherein the coating comprises a polyurea coating, a polyethylene coating, an epoxy coating, a polyurethane coating, an epoxy vinyl ester coating, an acrylic coating, an alkyd coating, or a silicone coating.

17. The composition of claim 16, wherein the composition is a coating, and wherein the coating comprises a powder coating.

18. The composition of claim 16, wherein the composition is a coating, and wherein the coating is applied by a draw down bar application technique, a conventional spray application technique, an airless spray application technique, or an electrostatic spray application technique.

19. A method of creating a self-healing polymeric material comprising:
   providing an unsaturated multifunctional resin capable of oxygen-initiated cross-linking and a polar solvent that is insoluble in water and has a boiling point ≥225° C.; and
   microencapsulating the unsaturated multifunctional resin and the polar solvent together, thereby creating the self-healing polymeric material.

20. The method of claim 19, wherein providing the unsaturated multifunctional resin comprises providing an alkyd resin.

21. The method of claim 20, wherein providing the alkyd resin comprises providing an alkyd resin formed from a fatty acid, a tri-functional alcohol and an acid or acid anhydride.

22. The method of claim 20, wherein providing the alkyd resin comprises providing an alkyd resin comprising a telechelic end group.

23. The method of claim 22, wherein providing the alkyd resin comprises providing an alkyd resin comprising a telechelic end group comprising an epoxy, an isocyanate, a polyol, a silanol, a vinyl terminated silane, a vinyl group, an unsaturated fatty acid, or an unsaturated functional group.

24. The method of claim 20, wherein the method further comprises providing a separately microencapsulated catalyst or curing agent.

25. The method of claim 19, wherein the method further comprises:
   providing a non-polar solvent; and
   microencapsulating the non-polar solvent together with the unsaturated multifunctional resin and the polar solvent.

26. The method of claim 25, wherein increasing a concentration of the microencapsulated polar solvent reduces premature oxygen-initiated cross-linking of the unsaturated multifunctional resin, and wherein decreasing the concentration of the microencapsulated polar solvent reduces a cure time of the unsaturated multifunctional resin.

27. A method of using a self-healing polymeric material to form a composition, wherein the method comprises adding the microencapsulated unsaturated multifunctional resin and polar solvent of claim 20 to a coating, a polymerized resin, an adhesive, a thermosetting composite, a thermoplastic composite, or a sealant, thereby creating the composition.

* * * * *